Dec. 15, 1942.　　　P. J. FABER　　　2,304,809
AUXILIARY DRIVE OR THE LIKE
Filed Dec. 4, 1939　　　3 Sheets-Sheet 1

INVENTOR.
Peter J Faber,
BY
ATTORNEY.

Dec. 15, 1942.  P. J. FABER  2,304,809
AUXILIARY DRIVE OR THE LIKE
Filed Dec. 4, 1939   3 Sheets-Sheet 2
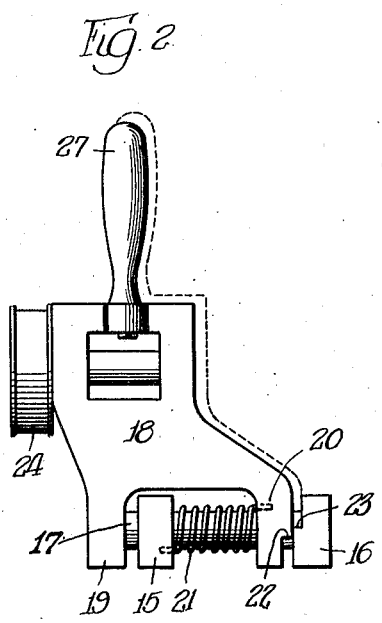
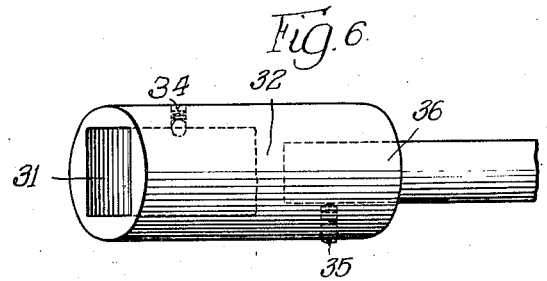
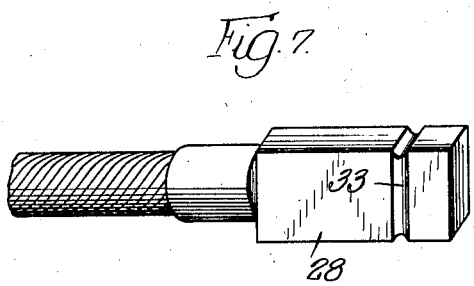
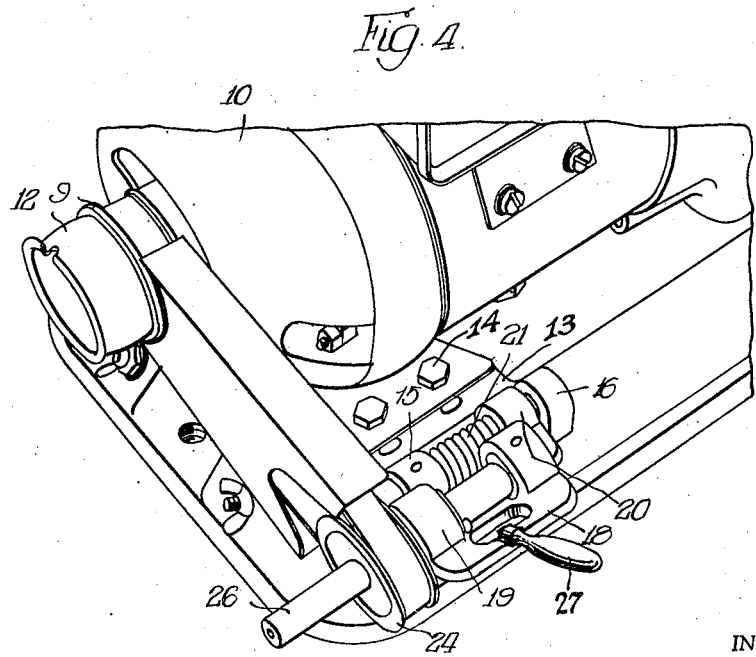
INVENTOR.
Peter J. Faber,
BY
ATTORNEY.

Patented Dec. 15, 1942

2,304,809

UNITED STATES PATENT OFFICE 2,304,809

AUXILIARY DRIVE OR THE LIKE

Peter J. Faber, Chicago, Ill., assignor to Montgomery Ward & Co., Incorporated, Chicago, Ill., a corporation of Illinois Application December 4, 1939, Serial No. 307,395

3 Claims. (Cl. 74—242.15)

This invention has to do with an attachment for small gasoline motors or other sources of power, providing driving means placing in operation when desired a flexible shaft, driven from the attachment by the power means, and means disengaging the attachment and thus the flexible shaft, as desired.

There are available, for farm use and otherwise, gasoline engines such as the small gasoline engine used on washing machines and the like. Ordinarily these engines are not useable unless firmly anchored with respect to the devices which they are driving, as the tension on a belt drive must be maintained fairly constant. As a result, most gasoline engines, particularly of the type mentioned, are not available to move from place to place for operation of different devices.

Also it is frequently desired to operate various devices from the same engine, which may be stationary, and to do so it is necessary to hook up special pullies and power transfer devices. As a result most persons do not secure the maximum benefit from their power plants.

It is a purpose of the present invention to provide an attachment which may be built right on to the engine structure, but preferably is added as a supplemental attachment with very little difficulty.

It is a further purpose to provide a device which has a driving connection to the source, preferably V-belt, of power, which connection may be engaged or disengaged by simple manipulation of a single lever, but when engaged will provide a very effective power drive.

It is a further object of the device to provide a locking arrangement which effectively retains the attachment in disengaged position with respect to the power means, except when the operator places it in driving relation.

One of the objects of this invention is to provide a means exerting constant tension in the proper amount on the driving belt, when such connection is used, at all times when in position for delivery of power on the auxiliary drive. This latter preferably is accomplished by means of spring tension.

It is an object to provide an arrangement which automatically and positively locks the attachment when the power means is disengaged, but an arrangement which permits the attachment to be reengaged by a simple operation of a handle or lever.

It is another object to provide a device which is easy and relatively inexpensive to manufacture, is adapted for adjustment to engines already on the market and in use today, and an adjustment which is sturdy and will last at least the life of the engine.

It is an object to provide auxiliary connecting parts, to receive a chuck on the end of the flexible shaft, which parts may be quickly placed in position on devices to be operated, such as washing machines or cream separators. These parts usually fit over the pulley shaft or some auxiliary driving shaft for the device to be operated.

It is an object to provide retaining means in or on the auxiliary connecting parts, such as a ball catch, retaining the chuck in driving engagement. Ordinarily the preferable form of chuck is square, and the connecting part mentioned above will have a square hole to receive the chuck on the flexible shaft. The chuck will have a groove to match the ball catch of the auxiliary connecting parts, for retaining the chuck in operative engagement.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

In the drawings:

Figure 2 is a fragmentary rear elevational view showing the auxiliary attachment in driving position, that is in position where the driving means from the power plant to the attachment is operatedly engaged, the disengaged position being indicated in dotted lines;

Figure 4 is a fragmentary perspective view showing the auxiliary attachment operatively engaged (the handle portion being omitted);

Figure 6 is a perspective view of an auxiliary connecting part adapted to receive a chuck on the end of the flexible shaft; and Figure 7 is a perspective view of a chuck adapted to fit the auxiliary part shown in Figure 6, said chuck being attached to the end of a flexible shaft such as shown in Figure 4.

Figure 1:
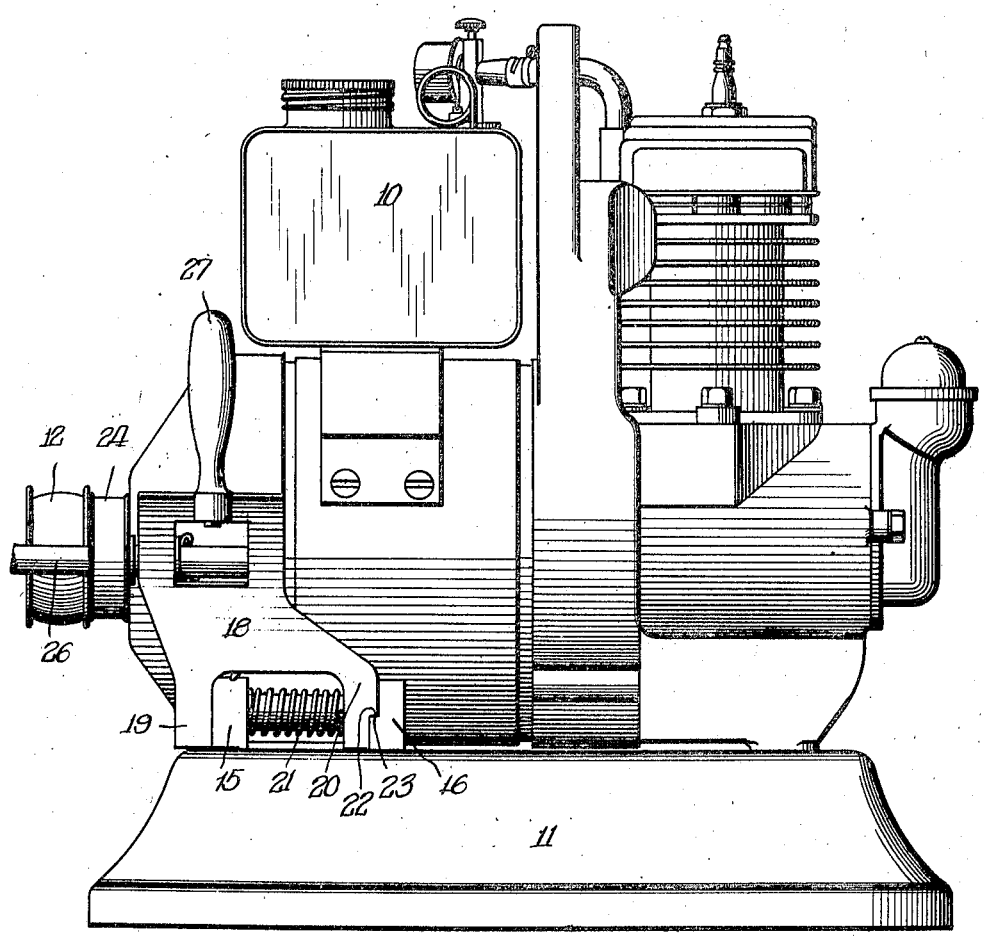
Figure 1 is a rear elevational view showing a small gasoline engine with the auxiliary attachment in position, but disengaged from the power driving means.

Referring more in detail to the construction shown in the various figures, number 10 illustrates a source of power such as a small gasoline engine. For the purpose of this application, 10 will be referred to as a gasoline engine although it is understood to cover obvious substitutes therefore such as electric motors, etc.

A gasoline engine 10 has the base 11 and the usual pulley 12, which pulley may also be used with a starting rope for starting the engine.

Adjacent the pulley 12, on the output shaft of the engine, I have provided a second pulley 9 preferably for a V-belt.

Attached to the base 11 of the gasoline engine is the auxiliary drive, which comprises the support 13, fastened to the base 11 by means of bolts or the like 14.

The support 13 is provided with support lugs 15 and 16, which carry the support shaft 17.

The support shaft 17 carries the movable arm 18, which has the base members 19 and 20. These base members 19 and 20 are journaled on the support shaft 17 so that they rotate with respect to the shaft and are slideable longitudinally of the shaft.

Figure 3:
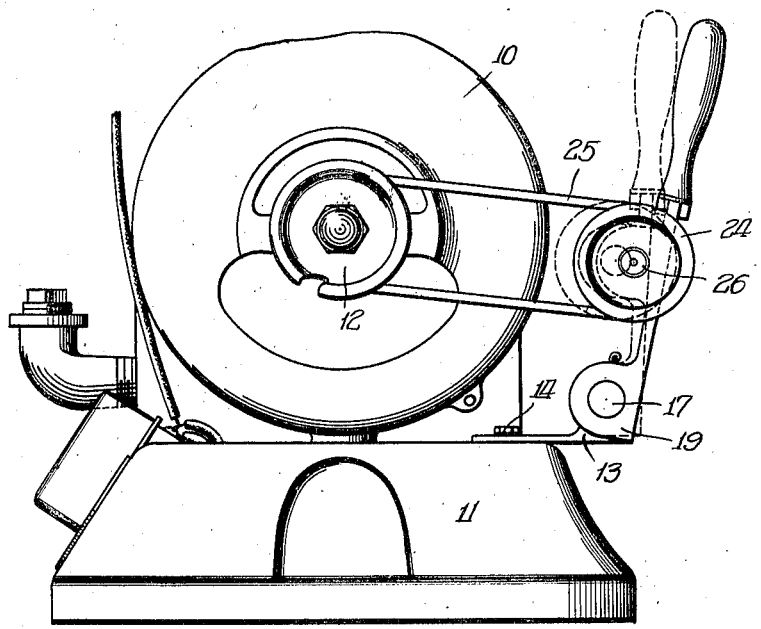
Figure 3 is a side elevational view of a gasoline engine with the auxiliary attachment in operative position as in Figure 2, dotted lines indicate the disengaged position where the device is inoperable for driving flexible shaft.
Figure 5:
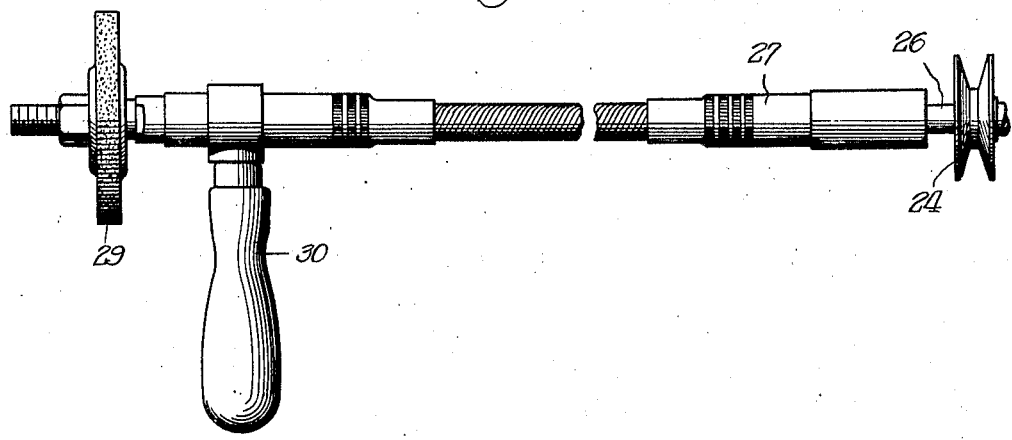
Figure 5 is a fragmentary view showing the flexible shaft on the output shaft of the auxiliary attachment.

I have provided means, preferably a spring or the like 21, normally exerting tension holding the movable arm as far to the right, as in Figure 1, as the support lugs 15 and 16, working against the base members 19 and 20, will permit the movable arm to go. The spring 21 is also anchored on the movable arm 18 and exerts a tension on the movable arm 18 causing the arm 18 to swing outwardly at the top and away from the engine. This will be most apparent in Figures 3 and 4. The spring ends are anchored by any convenient means such as inserting one end thereof in a hole in the lug 15 and the other end in a similar hole in base member 20, as best apparent in Figure 2.

The base member 20 is provided with an undercut or ledge portion 22, designed to fit over a corresponding support lug ledge portion 23 on the support lug 16. When the movable arm 18 is pressed inwardly toward the engine, to the dotted line position of Figure 3, the spring 21 moves the arm to the right, as shown in Figure 1, and the ledge 22 rides over and engages the support lug ledge 23, and retains the movable arm 18 in disengaged position as shown in the dotted lines in Figure 3.

Movement of the arm 18 to the left, shown in Figures 1 and 2, at the same time permitting the arm to move outwardly when the ledge 22 has cleared the support lug ledge 23, will cause the arm 18 to assume an operating position wherein power is transmitted from the engine to the auxiliary drive shaft pulley 24, by means of the V-belt or the like 25. The auxiliary drive shaft pulley 24 is attached to and drives an auxiliary drive shaft 26, which is rotatably journaled on the arm 18. This journaling is clearly illustrated in Figure 4. The arm 18 is provided with a handle 27 which facilitates movement of the arm into and out of engaged driving position.

The auxiliary drive shaft 26 is provided with an ordinary flexible shaft 27, which in turn is provided with a chuck 28 as shown in Figure 6. This chuck may be removed and other operating parts providing such as the grinding wheel 29, which may be threaded on to the flexible shaft. The flexible shaft is likewise provided with the usual handle 30.

The chuck 28 is preferably square or angular, and has a groove 33 or other retaining means which normally retains it in the hole 31 of the auxiliary connecting part 32, as shown in Figure 6.

Cooperating with the groove 33, to retain the chuck in place in the auxiliary connecting part 32, is a ball catch 34. This ball catch 34 will hold the chuck 28 against outward movement, unless more than ordinary pressure is brought to bear in pulling the chuck out of the hole 31.

The auxiliary connecting part 32 is provided with a set screw 35, and a shaft receiving hole 36. This latter is adapted to fit on to a shaft to be driven and be retained in place by tightening the set screw 35. For this purpose, usually the pulley on the shaft to be driven is removed before the auxiliary connecting part 32 is attached.

It will be seen that a gasoline engine mounted on a platform sufficient to keep it from "creeping" or move under its own vibration may be readily utilized for a variety of purposes by merely connecting the flexible shaft to the device to be driven. Thus an engine which normally is used as a battery charger, may be readily adapted to driving a washing machine by attaching a flexible shaft to the auxiliary driving means herein described, and likewise connecting the shaft to the device to be driven. Operation of the handle means 27 as described previously herein will place the flexible shaft into engagement with the power means so that it is rotated, and in turn rotates the device to be driven.

Disengagement of the auxiliary device by use of the handle 27 loosens the V-belt 25 so that it will not operatively turn the auxiliary drive shaft pulley 24 and thus the drive shaft 26 and flexible shaft 27. This means that the engine may be used for other purposes, while the flexible shaft is connected to the auxiliary drive shaft 26.

It will be readily seen that engines may be equipped with this auxiliary clutch mechanism when shipped from the factory, or by simply drilling holes for the bolts 14, and placing a V-belt pulley on the drive shaft of the engine be adapted to the additional use desired.

Many engines have such a V-belt pulley as that last mentioned above already installed on the drive shaft, making it unnecessary to add such and making the installation of the auxiliary attachment forming the subject matter of this invention a simple process.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. An auxiliary drive with power transfer means to gasoline engines and the like comprising in combination a support attached to said engine, support lugs forming a portion of said support, at least one of said support lugs having a support lug ledge, a support shaft carried by said support lugs, a movable arm having integral base members, carried by said support shaft and movable with respect to said support, a ledge portion on at least one of said base members adapted to fit over the support lug ledge abovementioned when the movable arm is in drive disconnecting position, spring means normally exerting pressure holding said base member ledge over the support lug ledge and with power transfer means to the engine disengaged, said spring means normally exerting pressure on said movable arm maintaining it in power engaged position when said base member ledge abovementioned is disengaged from said support lug ledge, and means carried by said movable arm deriving power from the gasoline engine or the like when the movable arm is in engaged position.

2. An auxiliary drive of the class described comprising in combination a support having a support lug thereon said support lug having a support lug ledge, a support shaft, a movable arm on said support shaft movable with respect to the support lug, a base member forming a portion of said movable arm, said base member having a ledge portion adapted to fit over the support lug ledge, spring means normally retaining said movable arm in position with said ledge portion over said support lug ledge handle means operable to move said movable arm and the ledge portion bearing base member from over the support lug ledge, an auxiliary drive shaft journaled on said movable arm, driving means comprising a pulley or the like on said auxiliary drive shaft having driving connections to a source of power, and said pressure means above mentioned normally retaining said driving means in operable engagement when the ledge portion and support lug ledge above mentioned are disengaged.

3. Auxiliary drive attachment for a gasoline engine and the like comprising support lugs, a support shaft carried by said support lugs, a movable arm carried by said support shaft and movable longitudinally of said support shaft and laterally with respect to said support lugs, said movable arm being likewise rotatable in an arc about said support shaft as an axis, engaging means comprising a support lug ledge on at least one of said support lugs, engaging means on the movable arm adapted to engage said support lug engaging means when said movable arm is at the inward limit of rotary movement and positioned against said support lug engaging means, spring means exerting tension moving said movable arm against said supporting lugs and to the position of the outer limits of its rotary movement, said movable arm having an auxiliary drive shaft and auxiliary drive shaft pulley, substantially as described.

PETER J. FABER.